(12) United States Patent
Swinbanks et al.

(10) Patent No.: US 7,039,512 B2
(45) Date of Patent: May 2, 2006

(54) ACTIVE SUSPENSION FOR A MARINE PLATFORM

(75) Inventors: Malcolm A. Swinbanks, Alexandria, VA (US); David E. Simon, Alexandria, VA (US)

(73) Assignee: VSSL Commercial, Inc., Alexandria, VA (US)

( * ) Notice: Subject to any disclaimer, the term of this patent is extended or adjusted under 35 U.S.C. 154(b) by 0 days.

(21) Appl. No.: 10/379,921

(22) Filed: Mar. 6, 2003

(65) Prior Publication Data

US 2004/0024503 A1    Feb. 5, 2004

Related U.S. Application Data

(60) Provisional application No. 60/361,711, filed on Mar. 6, 2002, provisional application No. 60/414,669, filed on Oct. 1, 2002.

(51) Int. Cl.
*B60G 17/08*    (2006.01)

(52) U.S. Cl. .................... 701/37; 701/21; 248/550

(58) Field of Classification Search ............... 701/37, 701/36, 38, 45, 300, 301, 96, 49, 21; 342/61, 342/70, 71, 72; 188/266.1–266; 267/117–122; 280/707; 248/550
See application file for complete search history.

(56) References Cited

U.S. PATENT DOCUMENTS

| 3,427,038 | A | 2/1969 | Gauss et al. |
| 3,936,716 | A | 2/1976 | Bos |
| 3,995,883 | A | 12/1976 | Glaze |
| 4,363,377 | A | 12/1982 | Van Gerpen |
| 4,513,833 | A | 4/1985 | Sheldon |
| 4,685,698 | A | 8/1987 | Klinkner et al. |
| 4,887,609 | A | * 12/1989 | Cole, Jr. ................. 600/509 |
| 4,887,699 | A | 12/1989 | Ivers et al. |
| 4,898,257 | A | 2/1990 | Brandstadter |
| 5,022,628 | A | 6/1991 | Johnson et al. |
| 5,044,455 | A | 9/1991 | Tecco et al. |
| 5,092,800 | A | 3/1992 | Hirt |
| 5,097,916 | A | 3/1992 | Brandstadter |
| 5,124,938 | A | 6/1992 | Algrain |
| 5,207,408 | A | 5/1993 | Burg |
| 5,348,265 | A | 9/1994 | Burg |
| 5,477,453 | A | 12/1995 | Harashima |
| 5,511,979 | A | 4/1996 | Perfect et al. |
| 5,536,059 | A | 7/1996 | Amirouche |
| 5,582,085 | A | * 12/1996 | Ellis ....................... 82/118 |
| 5,652,704 | A | 7/1997 | Catanzarite |
| 5,712,783 | A | 1/1998 | Catanzarite |
| 5,810,125 | A | 9/1998 | Gezari |
| 5,822,813 | A | 10/1998 | Powell |
| 5,853,330 | A | 12/1998 | Engstrand |
| 5,922,039 | A | 7/1999 | Welch et al. |

(Continued)

*Primary Examiner*—Richard M. Camby
(74) *Attorney, Agent, or Firm*—Dickstein Shapiro Morin & Oshinsky LLP

(57) ABSTRACT

An active suspension system is used to control the motion of a passenger seat in a high speed watercraft. A forward looking wave sensor is used in connection with a feed-forward wave impact shock predictor to determine characteristics of impending dynamic forces applied via the impact of the watercraft on waves. Information concerning the impending dynamic forces is used by a passenger seat suspension and control system to attenuate the shock effects on passengers, where such effects are characterized by large-amplitude, short-duration accelerations recurring at a low frequency and/or irregularly.

3 Claims, 5 Drawing Sheets

U.S. PATENT DOCUMENTS

| | | |
|---|---|---|
| 6,182,596 B1 | 2/2001 | Johnson |
| 6,237,889 B1 | 5/2001 | Bischoff |
| 6,420,996 B1 * | 7/2002 | Stopczynski et al. ......... 342/70 |
| 6,782,316 B1 * | 8/2004 | Breed et al. .................. 701/49 |
| 6,784,379 B1 * | 8/2004 | Breed et al. ................. 177/144 |
| 6,792,342 B1 * | 9/2004 | Breed et al. .................. 701/45 |

* cited by examiner

ACTIVE SUSPENSION FOR A MARINE PLATFORM

The present application claims priority to provisional application 60/361,711, filed Mar. 6, 2002, entitled "Active Control System," and provisional application 60/414,669, filed Oct. 1, 2002, entitled "Active Control System," the disclosures of which are incorporated herein in their entirety.

FIELD OF THE INVENTION

The present invention relates to a system and method for mitigating shocks, vibrations and other dynamic forces. More particularly, the invention relates to a system for actively controlling the motion of one or more passenger seats or other supports in a dynamic environment.

DISCUSSION OF RELATED ART

Designers and manufacturers of high speed vehicles seek to increase performance and improve the quality of the ride experienced by passengers. For this reason, passenger seats on high-performance watercraft may be provided with padding and shock absorbers to attenuate mechanical shocks.

U.S. Pat. No. 5,810,125 to Gezari refers to an active shock-absorbing seat system for high-speed, high-performance watercraft. In the Gezari system, accelerometers coupled to the seat and deck and sensors within the shock-absorbing system sense the watercraft motion, and actively-controlled shock absorbers connected to the passenger seats use the sensor information to reduce the accelerative forces experienced by passengers.

U.S. Pat. No. 4,363,377 to Van Gerpen refers to an active suspension system for controlling a tractor seat during low frequency jolts and bumps. The Van Gerpen system aims to maintain the seat within a substantially horizontal plane as the tractor moves up and down. In the Van Gerpen system, the control is based on a mass vibrometer located within a tractor.

U.S. Pat. No. 6,059,253 to Koutsky discloses a suspension system for controlling a vehicle seat for up to six different types of motions (six degrees of freedom). The suspension system is also intended to act as a structural support for the seat. Koutsky relies on movement and position sensors located within the vehicle. As the vehicle encounters a bump, the sensors provide feedback to a control unit, which controls the seat suspension system. The entire disclosure of the Koutsky patent is incorporated herein by reference.

Known shock absorbers and seat control systems are not able to effectively attenuate the effects of shocks, such as mechanical shocks caused by a watercraft striking waves at high speed. For example, during high speed maneuvering in high performance watercraft, successive collisions with waves may cause a passenger to repeatedly experience shock events including brief accelerations as high as nine Gs (i.e., nine times the normal force of gravity) or more. The shock events may recur periodically, for example once every one and one-half seconds. Currently available systems are unable to adequately attenuate such disturbances, due in part to the short duration and large amplitude of the disturbances, and also because the event timing may be irregular.

SUMMARY OF THE INVENTION

The present invention relates to an active suspension system adapted to reduce shocks experienced by a subject in a dynamic environment. In one aspect, the invention includes an active support system that has a forward looking sensor for generating control signals, a support device for supporting a passenger, and a controller for controlling the support device in response to the control signals. According to another aspect of the invention, the active support system may be incorporated into a high speed watercraft (speedboat), such that the forward looking sensor senses waves about to collide with the speedboat. In one embodiment of the invention, the forward-looking sensor provides an estimate of time-to-impact with respect to the collision of the speedboat and the waves. (The term "waves" is used herein to include, but is not limited to, waves formed by wind, weather and tides in a body of water, as well as waves in the wakes of ships, other boats, etc.). If desired, the speedboat also may be provided with motion sensors and a closed loop control system, as described in more detail below.

In addition, the invention relates to a method of operating a boat, wherein the method includes the steps of sensing wave characteristics such as wave position and wave velocity, and other parameters such as boat velocity and acceleration. The method also includes actuating a support (such as a support for a passenger seat) in response to the wave characteristics and other parameters. In one aspect the invention includes steps of transmitting signals from a sensor coupled to the boat towards a surface of the water, receiving signals reflected from the surface of the water, and actuating the support in response to the reflected signals so as to attenuate shock effects.

In a further aspect, the invention relates to a method of operating a boat where the method includes the steps of receiving an acceleration signal from an accelerometer coupled to the boat. The acceleration signal conveys information related to one or more shocks experienced by the boat. The method includes predicting future behavior of the boat based on the information conveyed by the acceleration signal and activating a suspension system to counteract the effects of such future behavior. An object of the invention is, therefore, to reduce the accelerations that would otherwise be felt by passengers, cargo, and boat systems, as a result of the boat striking the waves.

In other embodiments, the invention provides an improved suspension system for controlling the motion of one or more passenger seats in a vehicle such as an aircraft, hovercraft, or land vehicle. In a preferred embodiment of the invention, the system is configured to attenuate large-amplitude, short-duration accelerations that may recur at a low frequency and/or irregularly.

In a further aspect, the invention relates to an active suspension system adapted to predict impulse and repetitive shocks experienced by a subject in a dynamic environment based on previously sensed system accelerations. For example, a sensed magnitude of an initial shock experienced by a boat as its bow contacts an on-coming wave is applied, along with other sensed control inputs (such as vessel velocity), to a model including known characteristics of the boat to predict future shock magnitudes related to contact of the boat's keel and bottom with the water surface.

In a further aspect of the invention, a duration of a sensed acceleration identifiable as a free-fall acceleration of the boat may be quantified. This quantified duration may then be applied to a mathematical model incorporating boat characteristics and other control inputs to predict likely accelerations upon impact of the boat with a water surface.

In a further aspect of the invention, active and passive shock absorbing systems are applied concurrently or alternately to control the motion of a subject on a boat. In particular, the invention includes a controlled passenger seat including an active shock absorbing system adapted to minimize passenger shock during boat operations. The controlled passenger seat is further equipped with a passive shock absorbing system adapted to minimize passenger shock upon possible failure of the active shock absorbing system. The passive shock absorbing system is configured to be substantially "transparent" to the active shock absorbing system during operation of the active shock absorbing system. Likewise, the active shock absorbing system is designed to fail in a substantially "transparent" mode with respect to the passive shock absorbing system such that failure of the active shock absorbing system does not impair operation of the passive shock absorbing system.

In yet another aspect of the invention, the control system is adapted to control motion of a subject (such as a human passenger) so as to preferentially compensate for vehicle shocks of a magnitude and frequency known to be most damaging to the subject. For example, it is known that accelerations having vibration components in the 3 Hz to 12 Hz frequency range tend to deleteriously couple energy to the head-neck-shoulder system of a typical human. Accordingly, in one aspect of the invention, the control system is adapted to minimize acceleration of the human subject with respect to the subject's inertial frame of reference where the accelerations are in the 3 Hz to 12 Hz frequency range.

BRIEF DESCRIPTION OF THE DRAWINGS

The foregoing and other features and advantages of the invention will become more apparent from the detailed description of the exemplary embodiments of the invention given below with reference to the accompanying drawings in which.

DETAILED DESCRIPTION OF PREFERRED EMBODIMENTS

Figure 1:
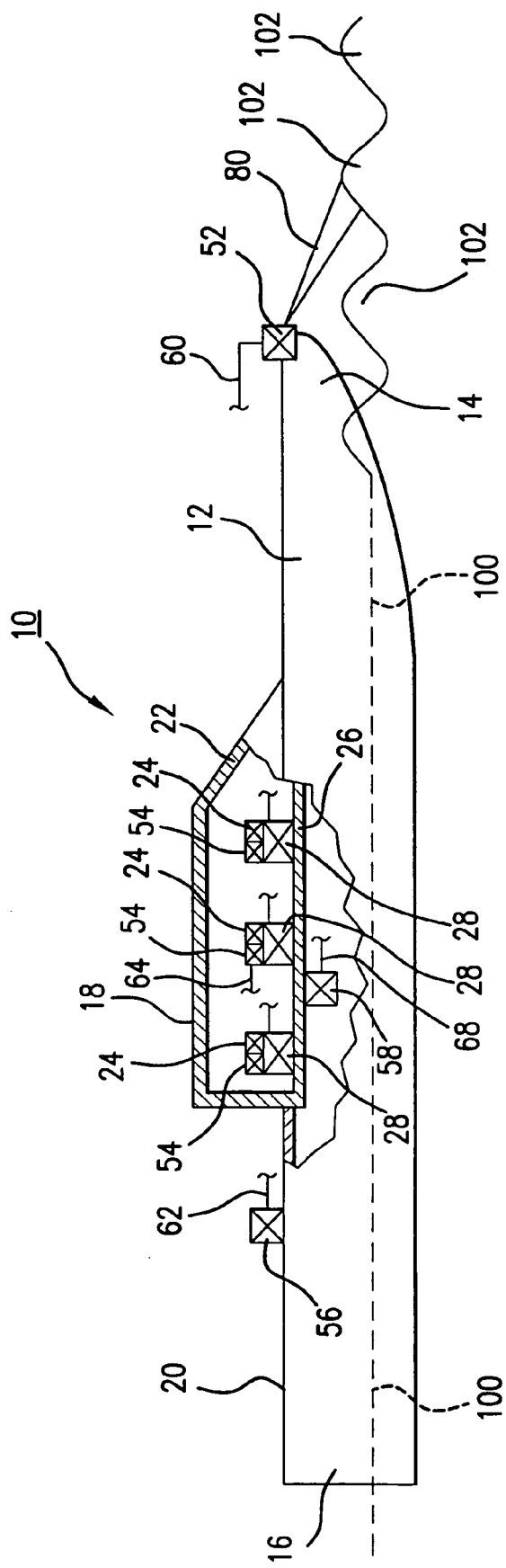
FIG. 1 is a partial cross sectional view of a watercraft constructed in accordance with a preferred embodiment of the present invention.

Referring now to the drawings, where like elements are designated by like reference numerals, there is shown in FIG. 1 a high performance boat 10 constructed in accordance with one embodiment of the invention. The boat 10 has a hull 12, a bow 14, a stern 16, a cabin 18, and a deck 20. If desired, the cabin 18 may be provided with windows 22 and suitable operator controls (not shown).

Figure 3:
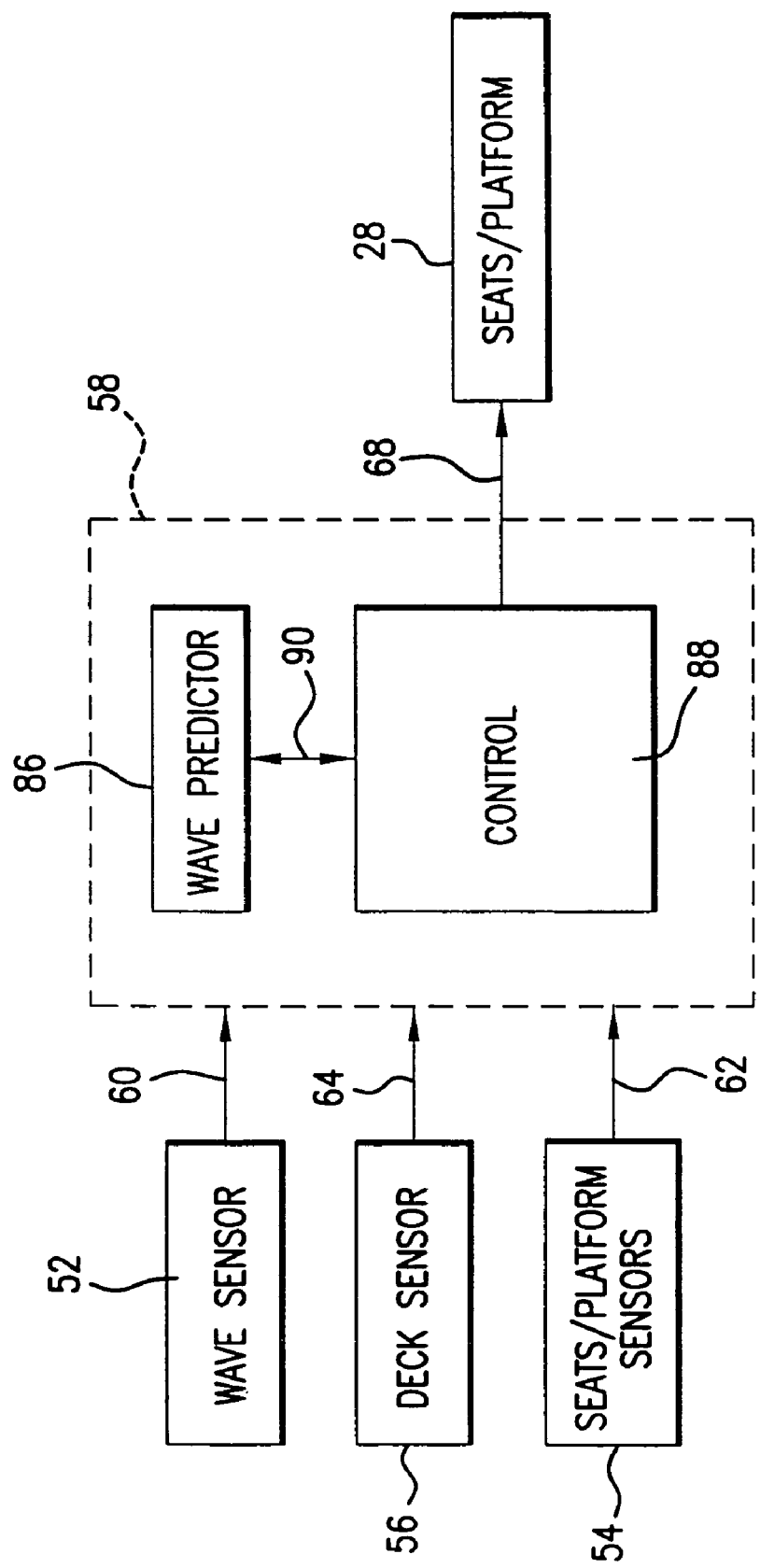
FIG. 3 is an exemplary block diagram of a control system for the watercraft of FIG. 1.

In one exemplary embodiment, a boat 10 is provided with a forward looking wave sensor 52, passenger supports such as seats 24, a support motion sensor 54 for each passenger support 24, and a deck motion sensor 56. The forward looking wave sensor 52 is located near the bow 14. The support motion sensors 54 are fixed to the respective passenger supports 24. The deck motion sensor 56 is fixed to the deck 20, preferably between the stern 16 and the cabin 18. These input sensors 52, 54, 56 are coupled to an electronic control system 58 by suitable incoming signal lines 60, 62, 64 (FIG. 3). The control system 58 is in turn coupled to the suspension devices 28 by suitable outgoing signal lines 68. The suspension devices 28 are operated by the control system 58 as described in more detail below. The control system 58 may be located in a protected, watertight location within the hull 12 (i.e., inside the boat 10).

The passenger supports 24 are located within the cabin 18. The supports 24 may be located on and/or fixed to a platform 26 that is fixed to the hull 12. The supports 24 may be seats, rails and/or guides for supporting passengers, operators and/or deck hands in seated or standing positions. In a preferred embodiment of the invention, the supports 24 are adapted to support seated or standing passengers and disposed so that the passengers can see out of the windows 22. For example, there may be three or more seats 24 located within the cabin 18. Each seat 24 may be connected to the same rigid platform 26.

Figure 2A:
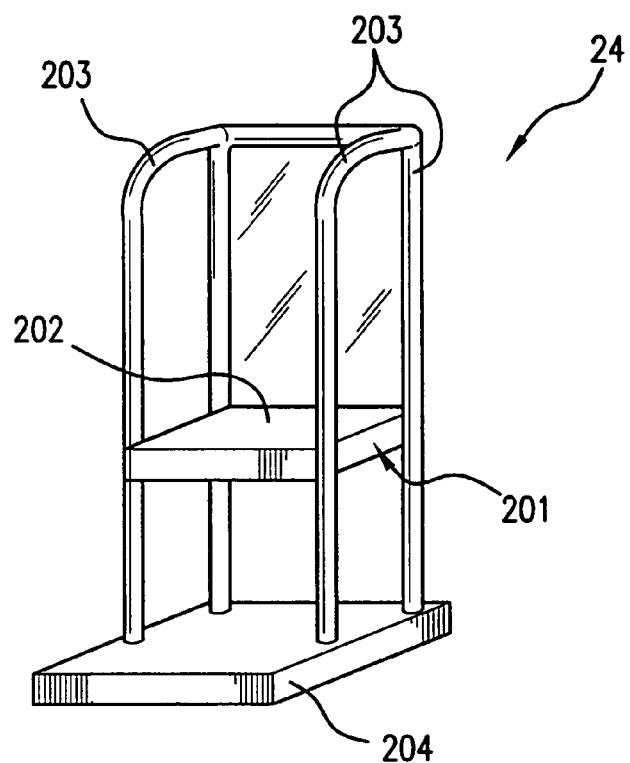
FIG. 2A is an illustration of a passenger seat according to one aspect of the invention.
Figure 2B:
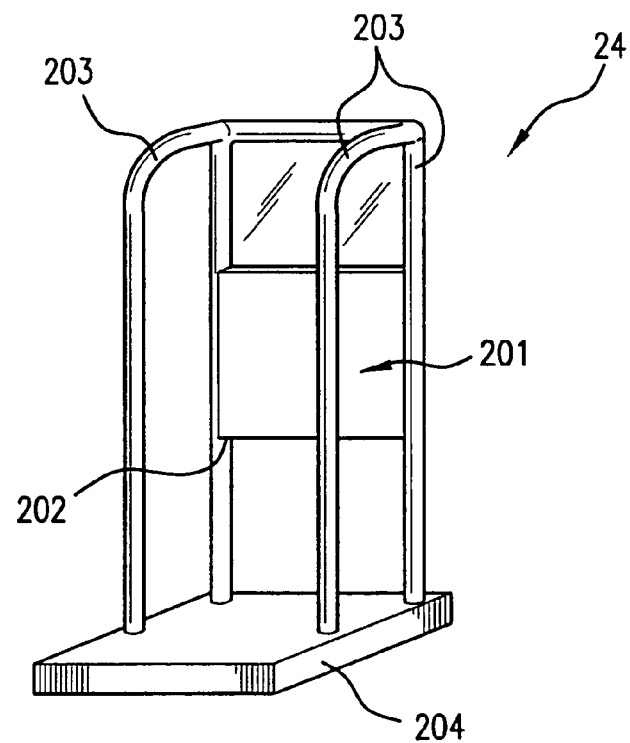
FIG. 2B is an illustration of a passenger seat according to one aspect of the invention.

In one embodiment, and as seen in FIGS. 2A and 2B, the support 24 may include a seat pan 201 having a hinge 202 for coupling the seat pan 201 to a support structure 203 of the seat. The seat pan 201 thus may be disposed in either a first orientation (as in FIG. 2A), in which the passenger may sit on the seat pan 201, or in a second orientation (as in FIG. 2B), in which the seat pan 201 is out of the way of a standing passenger. The support 24 may also include a platform 204 coupled to the support structure 203 of the support 24 below the seat pan 201. Accordingly, the passenger may sit on the seat pan 201 or stand on the platform 204, according to environmental conditions and personal preference.

Referring again to FIG. 1, in operation, the boat 10 moves through the water 100 and the bow 14 successively strikes individual waves 102. A shock is sent through the hull 12 to the platform 26 each time the bow 14 collides with a wave 102. The magnitude and direction of the shock experienced by the platform 26 is functionally related to (1) the size of the wave 102 as measured in the line of travel of the bow 14 and (2) the velocity of the bow 14 relative to the impacted wave 102.

To reduce the transmission of shocks and other vibrations from the boat to the passengers, the supports 24 are coupled to the platform 26 by suspension devices 28. Each suspension device 28 may be arranged to control the position and/or motion of the respective support 24 (and hence the position and/or motion of the seated passenger) relative to the platform 26 with up to six degrees of freedom. The suspension device 28 may include active and passive shock reduction elements. The active elements of the suspension device 28 may include suitable actuators (including, e.g., pneumatic, hydraulic or electromagnetic actuators). In one embodiment, the electromagnetic actuators may include actuators such as those described in U.S. Pat. No. 6,487,061 the disclosure of which is herewith incorporated by reference in its entirety. In another embodiment, the electromagnetic actuators may include actuators having a rack-and-pinion system in which a rack coupled to the support 24 is driven by an electric motor through a pinion gear drivingly disposed between a shaft of the motor and the rack. In yet another embodiment, the electromagnetic actuators may include a linear electric motor. The passive suspension elements may include springs (including e.g., air springs, coil springs, torsion springs) and damping mechanisms (such as e.g., hydraulic dashpot, pneumatic orifice, electrical eddy current damping mechanisms). The suspension devices 28 cause the supports 24 to move relative to the platform 26 such that accelerations of the platform 26 are partially or fully attenuated before reaching the passengers.

In one aspect of the invention, the passive suspension elements and active suspension elements are operative during different operating time intervals. When the active suspension elements are operative, the passive suspension elements are adapted to be substantially "transparent." That is, when the active suspension elements are operative, the passive suspension elements do not appreciably affect the motion of the support 24, and do not interfere with the ability of the active suspension elements to attenuate applied shocks. In one embodiment of the invention, virtual transparency of the passive suspension elements is effected by having the active suspension system output supplemental forces adapted to counter, and overcome, the forces exerted by the passive suspension elements. In other words, the active suspension system actuators drive the passive suspension elements in such a way as to substantially compensate for the forces that the passive suspension elements would otherwise exert.

Likewise, during an interval when the active suspension elements are not operative, as when the active suspension elements have experienced a failure, the passive suspension elements are operative and the active suspension elements are substantially transparent. In one embodiment, the active suspension elements are implemented as a rack and pinion system in which an electric motor is coupled to drive a rack through a pinion. When the electric motor is inactive, as during motor failure or when the motor is turned off, the forces, such as inertial and frictional forces, exerted by the inactive motor on the rack system are substantially negligible. In another embodiment, the active suspension elements are implemented as a linear electric motor having a stator device coupled to the platform 26 and an armature coupled to the support 24 (platform and support as seen in FIG. 1). The linear electric motor is configured such that when the linear electric motor is inactive, as during motor failure or when the motor is turned off, the forces, such as inertial and frictional forces, exerted by the inactive motor on the support 24 are substantially negligible. In this way, the active suspension elements do not interfere with the operation of the passive suspension elements. In a further aspect, the active and passive suspension elements may operate concurrently. Accordingly in some modes of operation the active suspension elements may provide forces opposing forces supplied by the passive suspension elements. In other modes of operation, the active suspension elements may provide forces supplementing forces supplied by the passive suspension elements such that the active and passive suspension elements operate in cooperative fashion.

The suspension devices 28 may be actuated in response to signals received from the control system 58. As discussed in more detail below, the control system may be an open loop control system or a closed loop control system, and may include both feed-forward and feedback control elements. The control system may add energy to, and absorb energy from, the active suspension elements. The control system may also control the passive suspension elements by dynamically adjusting response characteristics of the passive suspension elements. Such adjustment may include real-time modification of damping characteristics up to and including disconnecting, or otherwise rendering transparent, the passive suspension elements, as required.

In one embodiment, the control system 58 receives control inputs from an operator, such as a seat occupant or a boat operator. The control system 58 may also receive control inputs including information related to the boat environment, the boat 10, the support 24 and a passenger. The various inputs may be used by the controller to form output signals adapted to control the active and passive suspension elements. In one aspect, the control system also receives pre-defined parameters and other software entered during initial programming or during system initialization, and adapted to define the output response of the control system relative to particular input values.

The wave sensor 52 may operate, at least in part, according to known RADAR (such as, e.g., Doppler RADAR or Wideband Pulsed RADAR), SONAR, LIDAR, microwave, infrared and/or laser-doppler velocimetry principles. If desired, the sensor 52 may be formed of multiple outgoing signal transmitters of different types and multiple reflected signal receivers of various types. The outgoing signal transmitters may be oriented in different directions.

In operation, the wave sensor 52 transmits optical, acoustic and/or electromagnetic signals 80 in the forward direction toward the water 100 in front of the boat 10. The outgoing signals 80 are reflected by the waves 102, and the reflected signals are received by the wave sensor 52. The wave sensor 52 may be provided with suitable timing and memory devices for generating and accumulating data representative of the magnitudes and motion histories of the waves 102 relative to the bow 14. In one embodiment, the wave sensor 52 may measure distance between the sensor and a wave surface. In another embodiment, the wave sensor 52 may measure velocity of a wave relative to the wave sensor. To The amplitude of an incoming wave 102 may be determined, for example, by its height as measured vertically along a line aligned with the direction of motion of the bow 14.

While FIG. 1 shows a single forward-looking wave sensor 52, it is understood that a plurality of wave sensors may be disposed at various locations with respect to the hull 12 of the boat 10. The plurality of wave sensors may be oriented and adapted so as to provide wave data related to plural regions ahead of the bow 14, to port, to starboard, and aft of the boat 10. In one embodiment of the invention, the wave sensor 52 may include a downward-looking sensor (or a sensor having a downward-looking component) adapted to indicate a height of the hull 14 of the boat 10 above a service of a wave 102. It is also understood that additional sensor inputs may be applied in various embodiments of the invention. For example, wind velocity may be sensed in real time.

Turning now to FIG. 3, in one aspect of the invention, the signals generated by the wave sensor 52 are transmitted along the respective signal line 60 to a feed-forward wave predictor 86 of the control system 58. The wave predictor 86 processes the signals and in cooperation with a closed loop control unit 88, provides forecast signals that correlate to the timing, magnitude and/or other characteristics of the waves 102. For example, the wave predictor 86 may use the output of the wave sensor 52 to compute the time at which the next wave 102 is expected to be impacted by the hull 12 and the magnitude of the acceleration that will be imparted to the hull 12 by the impacted wave 102.

The control unit 88 may use the wave predictor forecasts together with data accumulated from the support motion sensors 54 to anticipate the times at which shocks will be felt in the platform 26 and the magnitudes and directions of the dynamic forces that will be transmitted from the bow 14 to the platform 26. The control unit 88 uses this information to operate the seat suspension devices 28 in a manner to reduce the accelerations that would otherwise be experienced by the passengers in the seats 24. (As used herein, the term "acceleration" includes positive accelerations, negative accelerations (i.e., decelerations) and angular accelerations. To "reduce" an acceleration means to cause its absolute value to be closer to zero.)

The support motion sensors 54 and the deck sensor 56 sense the motion, vibration and/or acceleration of the supports 24 and the deck 20, respectively. The support and deck sensors 54, 56 may include position sensors, velocity sensors and/or accelerometers, including devices for determining angular displacements and accelerations. The output signals (62, 64) generated by the motion sensors 54, 56 are supplied to the control unit 88 where they are processed in cooperation with the signals (90) from the wave predictor 86 to generate the actuation signals (68) that are supplied to the suspension devices 28. For example, in one embodiment of the invention, the forward-looking wave sensor 52 may provide a downward-looking component adapted to indicate a height of the hull 14 of the boat 10 above a surface of a wave 102. A downward-looking component signal output from such a forward-looking wave sensor 52 may be applied to the wave predictor 86, which may responsively provide an estimate of time-to-impact. That is, the wave predictor 86 may predict a time interval until a collision of the boat with a next oncoming wave. This estimate of time-to-impact may be combined with sensing signals from an accelerometer of the deck sensor 56 to calculate a duration between a time when the boat 10 enters freefall and a time when collision with the wave 102 surface is anticipated. The resulting time interval may be used to predict an accelerative force experienced by the boat 10 upon a collision of the hull 14 of the boat 10 with the wave 102. Accordingly, in one embodiment, prediction of significant forces may be achieved while processing a minimum of information, the information including a sensed time of entering freefall and a predicted time of collision.

In one embodiment, the invention includes a method of anticipating a mechanical shock such as a shock resulting from a bottom of a boat striking a surface of a wave 102. The method includes sensing a downward distance between the wave 102 and a surface of the boat 10 such as the bottom of the boat. At the same time, an acceleration sensor (accelerometer) attached to the boat senses a gravitational acceleration of the boat. In other words, as the boat begins to fall towards the water, the accelerometer senses the weightlessness associated with falling and determines a time at which the fall begins. A computer, receiving a downward distance between the boat in the water, and receiving a time at which falling begins, projects a duration-of-fall based on the distance and time. The computer then projects an anticipated mechanical shock that will result from a collision between the bottom of the boat and the water, based on the duration-of-fall. Once the anticipated mechanical shock has been calculated the value of the shock, along with the projected time of impact, is used by the computer to calculate a cancellation signal. The cancellation signal is received by the balance of a control system, including actuator drivers, to send actuation signals to actuators. The actuators move a payload, such as a passenger seat, in a motion adapted to cancel at least a portion of the shock that the payload would otherwise experience. As would be obvious to one of skill in the art, the payload might also be an instrumentation mount, an equipment mount, or a cargo storage platform, for example. Accordingly the instrumentation, equipment, or cargo would be afforded a measure of protection from the mechanical shocks produced by operation of the boat.

According to the illustrated embodiment, feed-forward control is performed by the wave sensor 52, the wave predictor 86, the seat sensors 54, the control unit 88 and the suspension devices 28. At the same time, closed loop feedback control is performed by the seat sensors 54, the deck sensor 56, the control unit 88 and the suspension devices 28. The feed-forward and feedback controls are performed simultaneously in a cooperative fashion to actuate the seat suspension devices 28 in up to six degrees of freedom. The result is a reduction in the acceleration that otherwise would be experienced by the passengers in the supports 24, as a result of shocks and vibrations applied to the hull 12.

In a further aspect of the invention, as described below, data related to plural degrees of freedom may be combined so that fewer than six axes of control are employed to control support motion. Thus, a system is described that reduces the consequences of shock events and vibrations for a passenger of a high performance vehicle such as a boat. Accelerations of the boat hull caused by wave impacts and vibrational forces are not felt by, or at least are not fully transmitted to, the passengers, as the positions and motions of the passenger seats are actively controlled in response to feed-forward signals from the wave sensor and feedback signals from the seat and deck sensors.

In a preferred embodiment of the invention, a control system including a feed-forward wave impact shock predictor uses the output of a forward looking wave sensor to determine a characteristic of an impending dynamic force (caused by the bow impacting a wave), and commands one or more actuators to produce a compensating motion of the supports, thereby reducing the G-forces experienced by the passenger(s). The system is especially effective to attenuate the effects of large-amplitude, short-duration shock events of low or irregular frequency and thereby improve the ride experienced by the passengers. If desired, the system also may be configured to compensate for higher frequency vibrations, such as those caused by the watercraft engine (typically located aft of the cabin).

In a further aspect, the invention includes characterizing a shock environment in which a watercraft operates. Features of the shock environment most deleterious to personnel, equipment and cargo may be identified with a high degree of detail and fidelity. The system is then optimized to preferentially mitigate the shock forces related to those most dangerous features with an active shock mitigation system.

In operation, the electronic control unit 58 receives dynamic signals (for example analog dynamic signals) from the motion sensor 56, the forward-looking wave sensor 52, the seat motion sensors 54 and the deck sensor 56. The dynamic signals received from the forward-looking wave sensor 52 may include information related to wave amplitude, change in wave amplitude, mean water level (relative to the vessel), wave velocity, change in wave velocity, wave direction and acceleration. Likewise, the dynamic signals received from the deck sensor 56 include deck position and acceleration with respect to up to six degrees of freedom.

The various dynamic signals are converted to digital signals by analog to digital converters (not shown). Conversion may be accomplished by dedicated analog to digital converters coupled respectively to the various signal sources, or may be accomplished by shared analog to digital converters receiving the various signals on a time-multiplexed basis. The analog to digital converters may be located within the control unit 58 or may be implemented externally.

The analog to digital converters output digital dynamic signals that are received as inputs to the wave predictor 86. The wave predictor 86 includes a mathematical model of water wave action incorporating known features of wave behavior and a transfer function characterizing the dynamic behavior of the watercraft in response to wave impacts. According to one aspect of the invention, the mathematical model of wave action is implemented in software and executed substantially in real time in a dedicated or general purpose processor (e.g., a digital signal processor). The software output then produces a predictive model of future water wave configuration over a particular time window and a particular spatial region in proximity to the watercraft.

Figure 4:
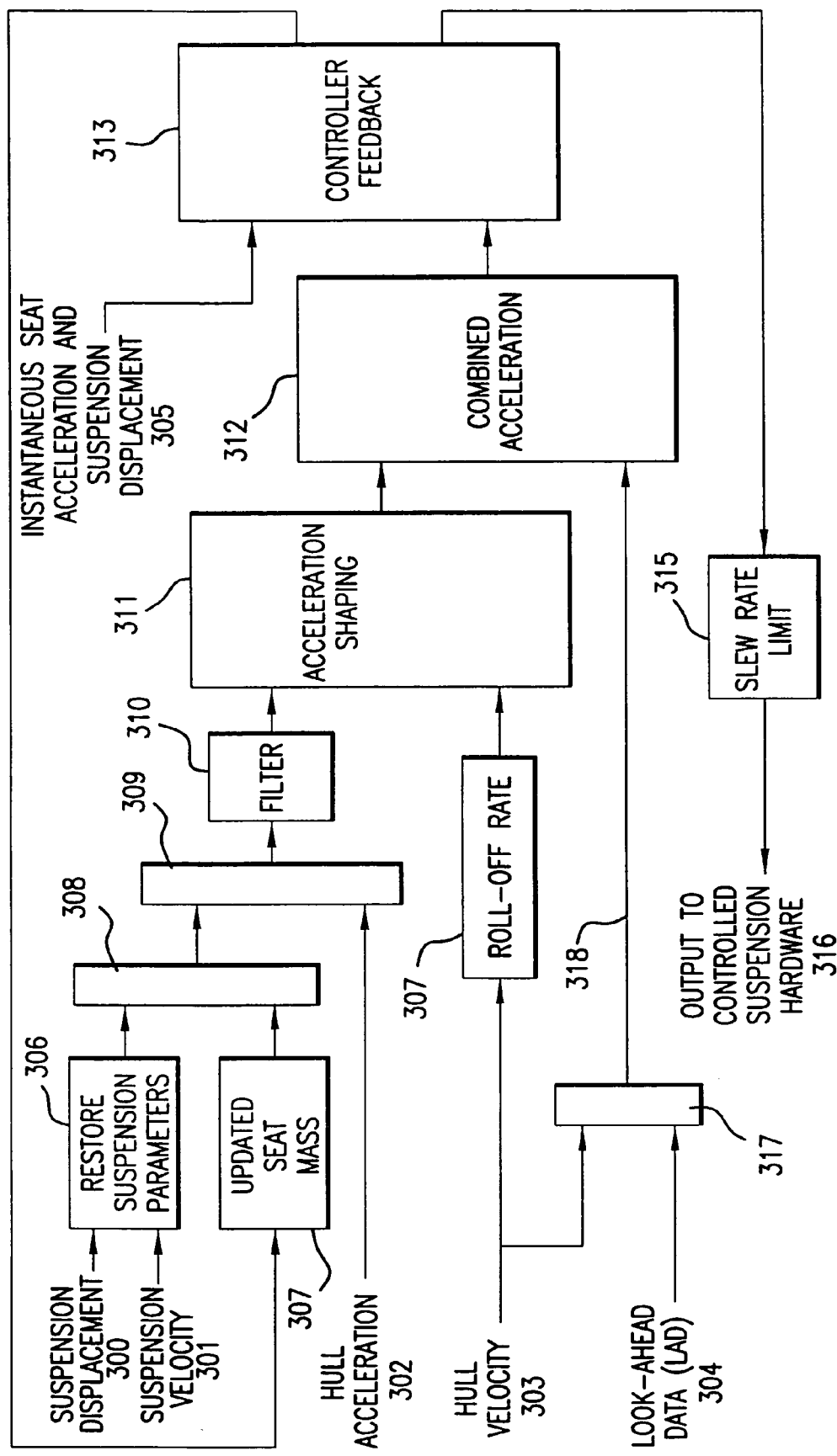
FIG. 4 is a control scheme diagram, illustrating the processing methods for an active control system according to an exemplary embodiment of the invention.

Turning to FIG. 4, a control scheme diagram for one embodiment of the electronic control unit 58 illustrates the processing of sensor signals (301–305), where an output signal 316 is ultimately generated and transmitted to external suspension devices 28 (as seen in FIG. 3). Displacement signals 300 and velocity signals 301 are received from external sensors (52, 54, 56 as seen in FIG. 3), and are processed at block 306 where a force value is calculated to restore suspension parameters. During times when hull acceleration data is not being transmitted to the system of FIG. 4, the active suspension components begin to drift from their resting position (or zero position), due to the gaps in the displacement data stream. The restore suspension parameters block 306 processes signals 300 and 301 to calculate a force value to bring back a suspension component (e.g., part of element 28) to a resting position. Once calculated, the force value is transmitted to acceleration block 308. Acceleration block 308 combines the force value from block 306 with the updated seat mass block 307 (which will be discussed in greater detail below), to generate a virtual suspension acceleration value that is transmitted to summing block 309, as shown in FIG. 4.

Summing block 309 performs a summation operation on the virtual acceleration value, output from acceleration block 308, along with the hull acceleration signals 302 being received from remote sensors. Under a preferred embodiment, the heave/pitch sensor data are combined, as well as the roll/sway data for further arithmetical operation. It is understood that each combination may be made independently from the summing block 309, or may be incorporated in other blocks shown in FIG. 4 (e.g., acceleration block 308). The summed value, output from summing block 309, is then transmitted to filter block 310, as shown in FIG. 4. Filter 310 receives the summed acceleration values from summing block 309 and initiates processing to reduce the feed-forward acceleration from the suspension in frequency bands ranging approximately from 3–12 Hz. Acceleration in the range from 3 to 12 Hz are considered, according to ISO standards, to be especially deleterious to the human body. Once filtered, a non-anticipatory (i.e., with no look-ahead components) acceleration value is transmitted to the acceleration shaping block 311.

Still referring to FIG. 4, hull velocity signal data 303 transmitted from remote sensors is received at roll off rate block 307. It should be noted that the hull acceleration signal 302 and hull velocity signal 303 are preferably sensed along the first principal component of motion (i.e., 1st combined motion). Once the orientation of the underlying combined motion has been determined, the remaining motion along the axis can be sensed with either a single sensor or a combination of sensors.

The roll off rate block 307 determines the rate at which feed-forward acceleration measurements will roll off. The rate is determined relative to the lagging acceleration, where acceleration peaks are sampled to determine a level at which acceleration will be rolled off. Under a preferred embodiment, when sensed acceleration peaks are low, the roll off rate would be greater, while higher acceleration peaks would trigger a lesser roll-off rate. Once a roll off rate is determined from block 307, the output is forwarded to the acceleration shaping block 311.

Once acceleration shaping block 311 receives the filtered acceleration data from filter block 310 and the roll-off rate from block 307, the acceleration shaping block generates a limited (i.e., rolled-off) non-anticipatory acceleration data signal, which is transmitted to the combined acceleration block 312. The combined acceleration block 312 further receives the data signal from multiplexer block 317, wherein multiplexer block receives look-ahead data (LAD) 304 transmitted from remote forward-looking sensors 52 (see FIG. 3). The multiplexer block 317 time multiplexes signals 303, 304 onto one line 318 for transmission to the combined acceleration block 312. It is understood that, while hull velocity data signals 303 and LAD signals 304 are multiplexed, they could also be transmitted independently to the combined acceleration module 312.

Combined acceleration module 312 processes the limited non-anticipatory acceleration data received from acceleration shaping block 311 and the multiplexed LAD/hull velocity data from multiplexer block 317 to generate a final demanded acceleration pulse, which is outputted to the controller feedback block 313 (as shown in FIG.). The final demanded acceleration signal indicates to the controller feedback block 313 the level of acceleration required for the seat suspension to counteract anticipated forces based on current sensor measurement. The controller feedback block 313 also receives the instantaneous seat acceleration and suspension displacement data 305 received from external sensors 54 (see FIG. 1). The controller feedback block 313 then compares the demanded acceleration received from the combined acceleration block 312 with the instantaneous data 305 to see if the levels match. If they do not, controller feedback block 313 feeds back a response signal to the updated seat mass block 307 to adjust and counter the force levels applied to the seat suspension (28). If the levels match, the force demand data signal is transmitted to the slew rate limit block 315, as shown in FIG. 4.

Slew rate limit block 315 limits the time rate of change of the acceleration signal going to the seat suspension, which effectively limits the amount of jerk applied to the seat, where "jerk" may be defined as the third derivative of displacement or the first derivative of the acceleration. The signal output from the slew rate block 315 is transmitted to controlled suspension hardware 316 as shown in FIG. 4. The output of the slew rate block 315 will carry data for the active suspension hardware indicating the levels of force required to counter or adjust the sensed forces.

Figure 5:
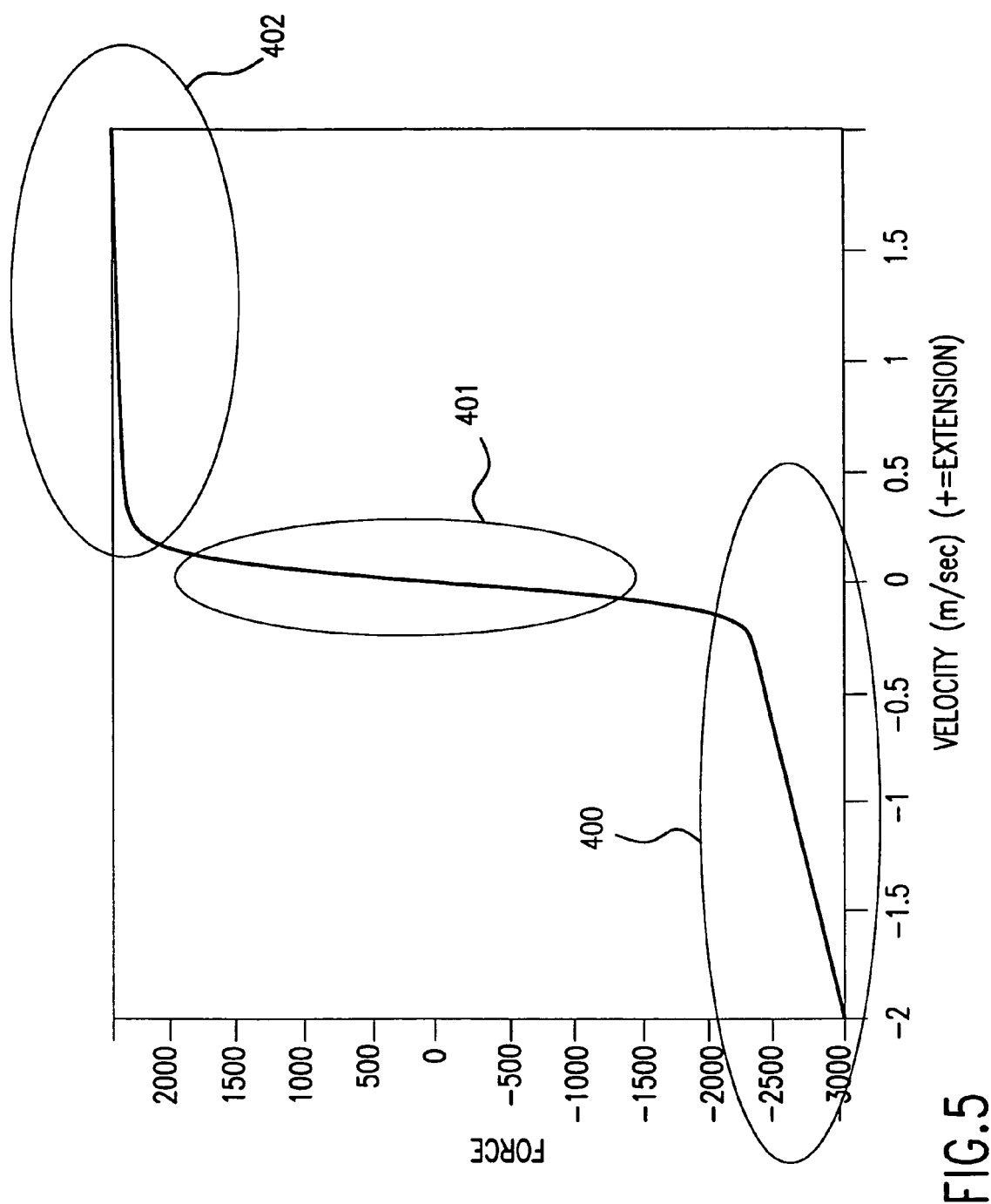
FIG. 5 illustrates an exemplary force-velocity response curve according to one embodiment of the invention.

FIG. 5 illustrates a preferred exemplary response curve for damping under the present invention. The damping response curve of FIG. 5 may be implemented in passive and/or active elements, and has the characteristic of having a bias towards compression (i.e., higher damping on compression). During instances where higher forces in compression are being exerted 400, a higher force slope at high relative velocity is generated until the velocity starts to approach zero as shown in FIG. 5.

Once velocity starts to approach zero, a sharp force-velocity 'nose' 401 response will occur, with an abrupt roll off, creating a flat force-velocity relation 402 at high relative velocity with increased expansion force. The curve shape illustrated in FIG. 5 can be expressed as:

$$\text{force} = g_1 \tanh\left(\frac{u}{g_2}\right) + g_3 \cdot u + g_4 \cdot |u|$$

where $g_1$ is the effective overall gain; $g_2$ is a blow-off delay gain which controls the suspension velocity at which the force/velocity characteristic changes significantly; $g_3$ is a slant gain, which determines the amount of force generated at high relative velocities; and $g_4$ is a skew gain, which biases the damper force towards either extension or compression.

Although the invention is described with reference to a high performance watercraft system, with a forward looking sensor for forecasting wave impacts, it should be understood that the invention is not necessarily limited to high speed watercraft. The invention may be used with other types of vehicles and equipment, for example barges, drilling rigs, submersibles, aircraft, helicopters, land-based vehicles, amphibious machinery, construction equipment and other vehicles and equipment that experience large-amplitude, short-duration shock events that recur at a low frequency and/or irregularly.

In addition, while the invention is described with reference to a closed loop control system using feedback sensor inputs (e.g., position and acceleration sensor inputs), it should be understood that the invention alternatively may be used with open-loop feed-forward control logic in addition to the fred-forward wave impact shock prediction logic used in connection with the forward looking wave sensor.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims. What is claimed as new and desired to be protected by Letters Patent of the United States is:

The invention claimed is:

1. An active support system, comprising:
   at least one forward looking sensor for generating output signals;
   a support device for supporting a passenger;
   a controller, coupled to said support device and said at least one forward looking sensor, wherein said controller adjusts forces in said support device in response to said output signals generated by said at least one forward looking sensor; and
   a feedback unit, coupled to said controller, wherein said controller further controls said support device in response to control signals generated from said feedback unit, and
   wherein the at least one forward looking sensor is a wave sensor.

2. The active support system of claim 1, wherein the feedback unit further comprises at least one seat sensor.

3. The active support system of claim 2, wherein the feedback unit further comprises at least one deck sensor.

* * * * *